(No Model.)
A. W. ANDERSON.
GRAVE DECORATING DEVICE.
No. 423,546. Patented Mar. 18, 1890.
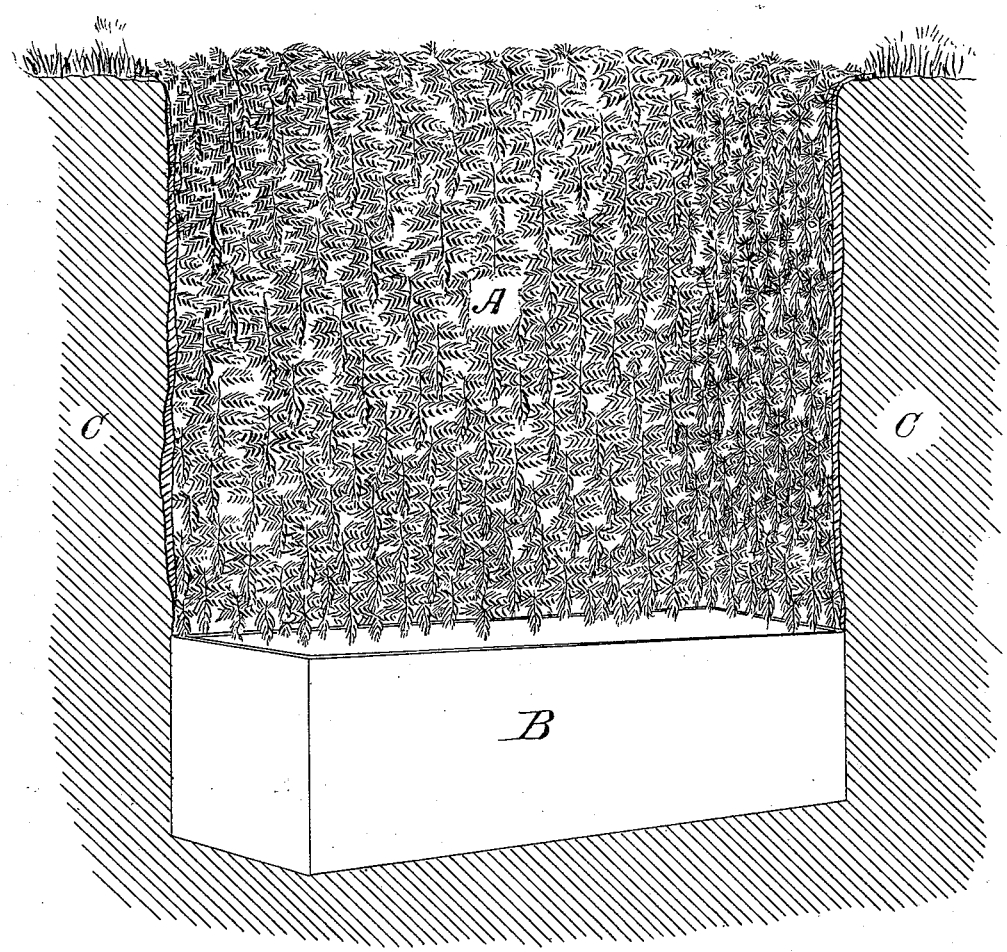

UNITED STATES PATENT OFFICE.

ANDREW W. ANDERSON, OF MINNEAPOLIS, MINNESOTA.

GRAVE-DECORATING DEVICE.

SPECIFICATION forming part of Letters Patent No. 423,546, dated March 18, 1890.

Application filed November 21, 1889. Serial No. 331,138. (No model.)

*To all whom it may concern:*

Be it known that I, ANDREW W. ANDERSON, a citizen of the United States, residing at Minneapolis, in the county of Hennepin and State of Minnesota, have invented certain new and useful Improvements in the Decoration of Graves with Evergreens at Funerals, of which the following is a specification.

Heretofore evergreens have been used in such decorations by cutting them into small twigs and covering the earth on the inside of the grave with them by fastening the twigs to the earth on the sides by long wire staples similar to large hair-pins.

The object of my invention is to provide a form of decoration with evergreen, or other material stained to resemble evergreen, which may be easily placed in a grave and as easily removed, and which may be used a great number of times. These objects are obtained by my invention, as shown by the accompanying drawing, showing a section of a grave with the decoration placed therein completely hiding the earth at the sides of the grave.

In the drawing, A represents the decoration (on which I wish to claim a patent) placed in the grave.

B represents the box in the bottom of the grave ready for the reception of the coffin, and C C are sections of earth at side of grave.

The decoration A is made, preferably, of cloth of some kind, and has evergreen or other material stained to resemble evergreen, fastened to it securely either by strings or wires, and is to be draped from the top of the grave all around the sides and to the box in the bottom, thus relieving the revulsion of feeling from seeing the bare earth sides of a grave.

When desired, flowers may be arranged among the evergreen.

What I claim for my invention, and desire to secure by Letters Patent, is—

A grave-decorating device consisting of a foundation of cloth, rubber matting, or other similar material, to which natural evergreen, or other material formed and stained or painted to resemble evergreen, is removably attached, in the manner and for the purpose specified.

ANDREW W. ANDERSON.

Witnesses:
JOHN W. FORBES,
GUSTAF CUDRELL.